(12) United States Patent
List

(10) Patent No.: US 7,459,184 B2
(45) Date of Patent: Dec. 2, 2008

(54) METHOD FOR PROTECTING A VEHICLE BODY FROM CORROSION

(76) Inventor: Reinhard List, Schubertstrass 26, 8010, Graz (AT)

( * ) Notice: Subject to any disclaimer, the term of this patent is extended or adjusted under 35 U.S.C. 154(b) by 0 days.

(21) Appl. No.: 10/534,641

(22) PCT Filed: Nov. 12, 2002

(86) PCT No.: PCT/EP02/12665

§ 371 (c)(1),
(2), (4) Date: May 11, 2005

(87) PCT Pub. No.: WO2004/044271

PCT Pub. Date: May 27, 2004

(65) Prior Publication Data

US 2006/0045977 A1    Mar. 2, 2006

(51) Int. Cl.
- *B05D 5/00* (2006.01)
- *B05D 7/14* (2006.01)
- *B05D 3/02* (2006.01)
- *F16J 15/02* (2006.01)
- *B60J 10/00* (2006.01)

(52) U.S. Cl. .................... 427/243; 427/247; 427/373

(58) Field of Classification Search ............... None
See application file for complete search history.

(56) References Cited

U.S. PATENT DOCUMENTS

| | | | | |
|---|---|---|---|---|
| 4,901,395 A | * | 2/1990 | Semrau | 16/2.2 |
| 5,160,465 A | * | 11/1992 | Soderberg | 264/46.5 |
| 5,524,907 A | * | 6/1996 | Walser | 277/640 |
| 5,678,826 A | * | 10/1997 | Miller | 277/316 |
| 5,931,474 A | * | 8/1999 | Chang et al. | 277/316 |
| 5,979,902 A | * | 11/1999 | Chang et al. | 277/316 |
| 6,062,624 A | * | 5/2000 | Crabtree et al. | 296/39.3 |
| 6,114,004 A | | 9/2000 | Dawes et al. | |
| 6,347,799 B1 | | 2/2002 | Mehan et al. | |

FOREIGN PATENT DOCUMENTS

| | | | |
|---|---|---|---|
| EP | 0 383 498 A2 | * | 8/1990 |
| EP | 0383498 A2 | | 8/1990 |
| EP | 0 453 777 A2 | * | 10/1991 |
| EP | 0453777 A2 | | 10/1991 |
| EP | 0 775 721 A1 | * | 1/1997 |
| EP | 0775721 A1 | | 5/1997 |
| EP | 1123957 A1 | | 8/2001 |
| JP | 60029479 | | 2/1985 |
| JP | 60096793 | | 5/1985 |

* cited by examiner

*Primary Examiner*—William Phillip Fletcher, III
(74) *Attorney, Agent, or Firm*—Central Coast Patent Agency, Inc.

(57) ABSTRACT

A method for providing corrosion protection in an assembly of two or more metal parts follows steps of (a) at a point in an assembly process for the assembly, placing at a juncture of any two of the two or more metal parts of the assembly, a corrosion-protection element comprising heat-expandable material, the corrosion-protection element shaped to conform to the juncture; and (b) expanding the corrosion-protection element at another point in the assembly process by application of heat.

8 Claims, 5 Drawing Sheets

METHOD FOR PROTECTING A VEHICLE BODY FROM CORROSION

BACKGROUND OF THE INVENTION

1. Field of the Invention

Figure 1:
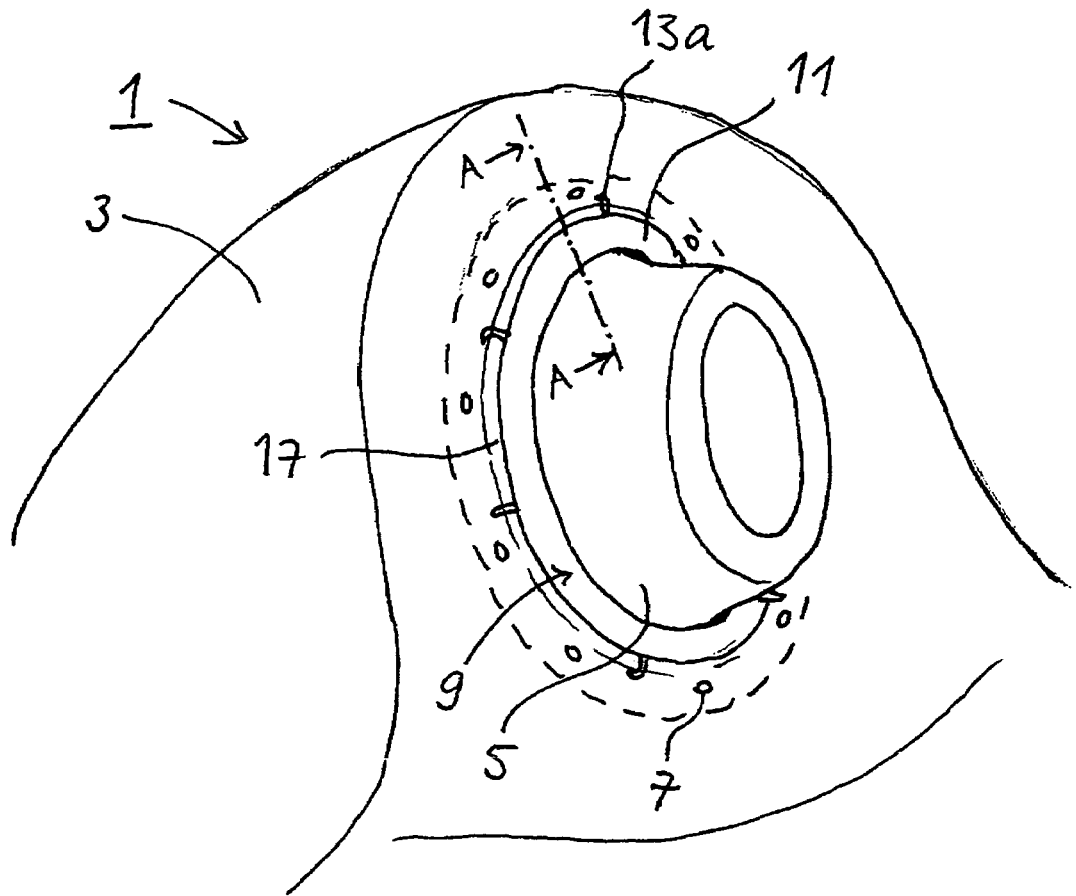

The invention relates to a method of treating boundary surfaces of a vehicle body, in particular for protection against corrosion, according to the pre-characterizing clause of claim 1 and/or 2, as well as a structural element (corrosion-protection element) suitable for carrying out this method.

2. Discussion of the State of the Art

Protection of a vehicle body against corrosion has for centuries been the goal of intensive development work in vehicle construction, in particular automobile manufacture, and has been steadily improved. The current status is so convincing that most of the large automobile manufacturers can issue many-year guarantees against serious damage to the body by rust.

An essential stage in the process of vehicle-body corrosion protection—in addition to galvanizing important or all parts and a high-quality final lacquering—is immersion in a bath of an anti-corrosion solution, the process of cathodal electrolytic dip-priming (customarily abbreviated CDP). In this process practically all the sheet-metal surfaces are wetted by a highly effective layer of material that protects against corrosion, which adheres firmly to the body when the body is removed from the bath.

Like the rest of modern automobile manufacture, the corrosion-protection stage has now become a highly automated process, in which for reasons of economy there is hardly any opportunity for manual measures to be implemented. Nevertheless, certain regions of vehicle bodies are still at extraordinarily great risk of corrosion, because they include welded points or seams and/or are especially exposed to attack by corrosive media encountered while the vehicle is in use; therefore these regions must be treated manually to protect them from corrosion, even in the present state of technology.

Among these regions is the supporting structure for the MacPherson strut unit, hereinafter referred to as the MacPherson-strut dome. There is customarily an annular gap between a so-called outer dome and inner dome, which are welded together at multiple points to form the strut support. This region, embedded in the lacquering process, is manually provided with an additional cover, by spraying a mass of PVC onto it or brushing on a thick anti-corrosion layer.

This procedure is comparatively inefficient (in the overall context of highly automated manufacture) and involves extra costs. Furthermore, during construction of the vehicle body provisions must be made for it; that is, the region that is to be protected by this means must remain adequately accessible for manual treatment during the lacquering process, i.e. even after substantial vehicle components have been installed in the body.

At other places in a vehicle body, for instance in the region between roof bow and roof of the vehicle, or at metal edges or flanges of the doors and the covers for engine and luggage compartments, there are regions for which an extra corrosion protection is reasonable but, according to the state of the art, can be accomplished only by manual application of an anti-corrosion medium. Like the corresponding measures in the region of the strut-support dome, such corrosion-protection operations are associated with increased personnel effort and hence expense. Furthermore, the relevant regions are in part visible to the eventual user of the vehicle, and the manually executed corrosion-protection measures do not give a convincing visual impression. In the last-mentioned region of a vehicle body, in addition to the corrosion protection it is also necessary for a lining layer to be provided between the outer surfaces and their supports (e.g., roof and roof bow), and this at present is ordinarily produced by manual application of a pasty mass. This process is encumbered by the same disadvantages as are manual corrosion-protection measures.

SUMMARY OF THE INVENTION

Hence the objective of the invention is to disclose an improved method of protecting against corrosion and/or providing an under-lining, which in particular is more economical and does not involve any undesirable limitations regarding the construction of the vehicle body.

This objective is achieved (in relatively independent manifestations of the idea underlying the invention) by a method with the characteristics given in claim 1 or 2. In addition, the invention makes available a structural element that can be employed in such a method.

The invention includes the fundamental idea of bringing about the additional protection required for regions particularly at risk of corrosion by means of a prefabricated corrosion-protection element that can be manipulated very rapidly in a simple manner. It additionally includes the idea of shifting the relevant manipulation step away from the final-lacquering stage of production—in which the regions in question are in some circumstances no longer readily accessible because of structural considerations—into an earlier stage of the production operation.

Furthermore, one aspect of the first variant of the invention is that this step should be inserted prior to the step in which the anti-corrosion medium is applied by dip-priming. This implies provision of a corrosion-protection element capable of surviving the relatively high temperatures in the anti-corrosion bath and still firmly adhering to the associated section of the vehicle body when this processing step has been completed. As a result of these considerations the following is proposed: in the case of a suitably shaped—in particular slot- and/or ring-shaped—body region, having a structurally specified boundary-surface constellation such that during performance of the method it will present sufficient resistance to an expanding structural element (corrosion-protection element), this region is provided, prior to immersion of the vehicle body in the bath, with a structural element that expands while in the CDP bath. As a result of expansion within the said boundary-surface constellation, the corrosion-protection element becomes independently "compressed" within the region to be protected. It is securely retained there by mechanical forces after the vehicle has left the bath, and thus securely shields this region from external factors, including corrosive influences.

In the second variant of the invention, the temperatures required for expansion by foaming of the expandable region of the proposed corrosion-protection element are provided in a separate, thermal treatment step. Such thermal treatment, above the foaming temperature (typically at 150° C. or more) and with a minimal duration such as is prescribed by the chemical composition of the expandable region, can be restricted to a particular region of the vehicle body. In the case of narrowly delimited regions, for example, it could be applied by means of a hand-guided warming or infrared-radiation device, insofar as this can be advantageously integrated into the technical processing sequence.

Whereas in the first variant, on account of the amount of time that must normally be spent in a CDP bath (15 min or more), relatively slowly foaming materials should be considered for the corrosion-protection element, for the second variant it is at present preferable to use reaction accelerators in an appropriate material, to shorten the foaming time.

The above considerations apply equally to body regions where the goal is not, or at least not primarily, an improved corrosion protection but rather mainly concerns the lining to be installed under these regions. With this in mind, the term "corrosion-protection element" is also used here to mean a lining or damping element.

In a preferred implementation of the method the corrosion-protection element comprises a section that expands by foaming at the elevated temperature and solidifies in this foamed state when it cools down. In a particularly advantageous further development, a corrosion-protection element with an EVA layer that foams when heated and is disposed on a thermostable carrier, in particular made of polyamide, is employed. Such compounds are commercially available at relatively economical prices, and simple tools can be used to shape them as required for the body region to be protected.

For certain kinds of use it is also possible to employ a corrosion-protection element consisting entirely of the material capable of expansion, i.e. without a carrier.

In an application with special practical significance, to which reference has already been made above, the region in danger of corrosion is an annular gap between an inner and an outer dome of a MacPherson strut support, and this region is provided with an annular corrosion-protection element. In this application the method in particular enables effective protection of the strut support against corrosion even when the construction of the vehicle is such that this region is entirely or partly covered by installed components during the processing stage in which the final lacquer coat is applied, and therefore is no longer accessible for a manual operation.

Comparable advantages are present when the proposed method is applied in relation to fixation elements (in particular pegs or pins) that are to be inserted into the vehicle body. These fixation elements are set into openings ("bores") in the body created for that purpose, producing an annular gap between the opening and the wall of the fixation element that is at risk of corrosion but can be provided with a corrosion-protection element of the kind proposed here, so that after foaming of said element the gap is tightly closed.

Other important applications include those in which an elongated gap, open on at least one side, between various parts of the body or adjacent sections of a single part is provided with an elongated corrosion-protection or lining element. The structures involved here can in particular be gaps between a roof bow and a vehicle roof, or a fold region of a cover for engine or luggage compartment or a vehicle door, or also of a water tank associated with a vehicle body.

Here, again, extra freedom results for the constructor and technologist, who no longer needs to take care that the relevant regions are kept accessible for manual operations even in the final lacquering stage. In every case the proposed method, which can be implemented to a certain extent by one manipulation, provides advantages with respect to labour costs in comparison to the previously customary application of a corrosion-protection mass by spraying or brushing it on.

Figure 8:
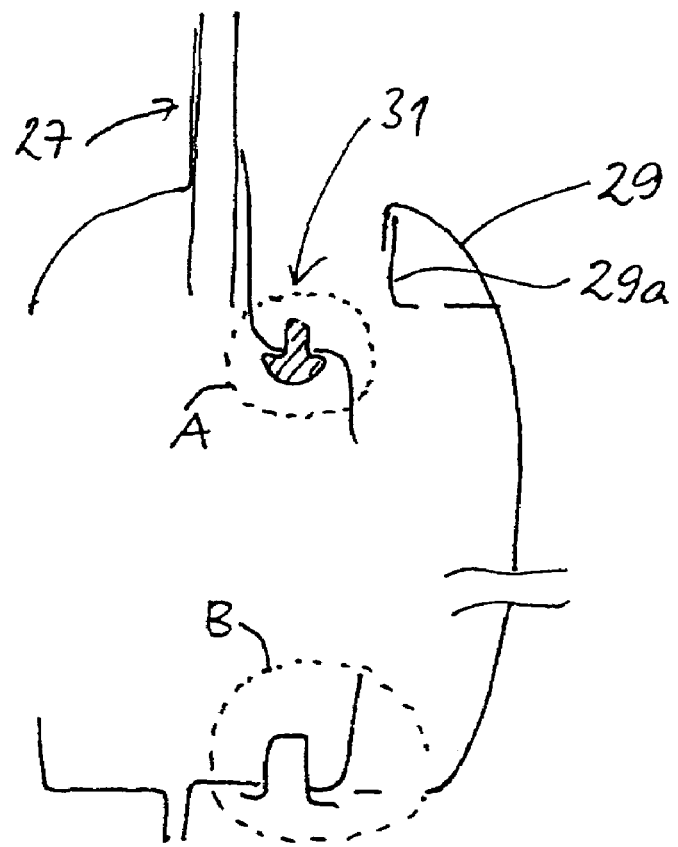

Whereas for the applications first mentioned above a corrosion-protection element is employed that has the basic shape of a ring (in particular circular rings, but for special cases also elliptical, oval or even more complex forms, such as a FIG. 8), for the second group of applications a corrosion-protection element in the form of an elongated profile is suitable. In particular, this can be an I, L, T or double-T profile, or a more complex profile consisting of a combination of such standard profile shapes. The foaming section is in particular provided in a marginal or angled region of an appropriately shaped carrier, or surrounds the latter. As already mentioned above, it is also possible to eliminate the carrier for special applications, so that the profile shape is determined entirely by the thermally expandable material.

Altogether, then the advantages of the proposed method and corrosion-protection element in its preferred embodiments are the time- and cost-saving elimination of manual corrosion-protection measures, the attainment of a product that makes a better visual impression by elimination of regions that appear "unclean", an increased processing reliability by elimination of unspecified processing situations associated with manual interventions (unreliability of the manual corrosion-protection operation, consumption of sealing material in amounts that are difficult to predict, variable product appeal) and, not the least important, an improvement of environment-friendliness in that no PVC-based substances are used for corrosion protection or as sealing and lining materials.

In an especially useful design of the corrosion-protection element, which can be reliably attached to the region of the vehicle body to be protected and is easy to handle, in its initial state the element is provided with one or more projections with which to fix it in the region at risk of corrosion. Examples of such projections, which in particular are moulded extensions of a carrier (for instance, the polyamide carrier mentioned above), include in particular a lip-shaped section or a plurality of small feet, which because of their shape and dimensions possess a degree of elasticity. They are adapted to the geometry of the body region to be protected in such a way that they can be securely hooked or clamped there while the corrosion-protection element is in its non-expanded initial state.

Further advantages and useful features of the invention will be apparent from the subordinate claims as well as the following description of a preferred exemplary embodiment with reference to the drawings, wherein

BRIEF DESCRIPTION OF THE DRAWING FIGURES

Figures 2A, 2B:
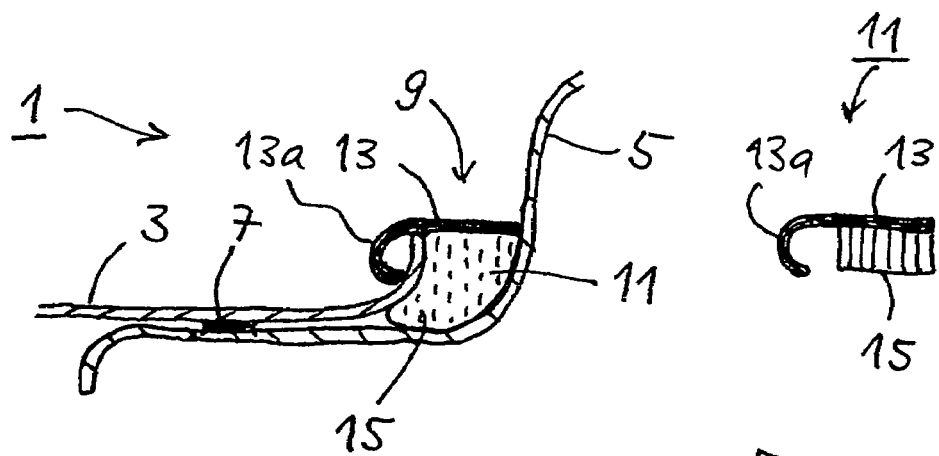
Figure 3:
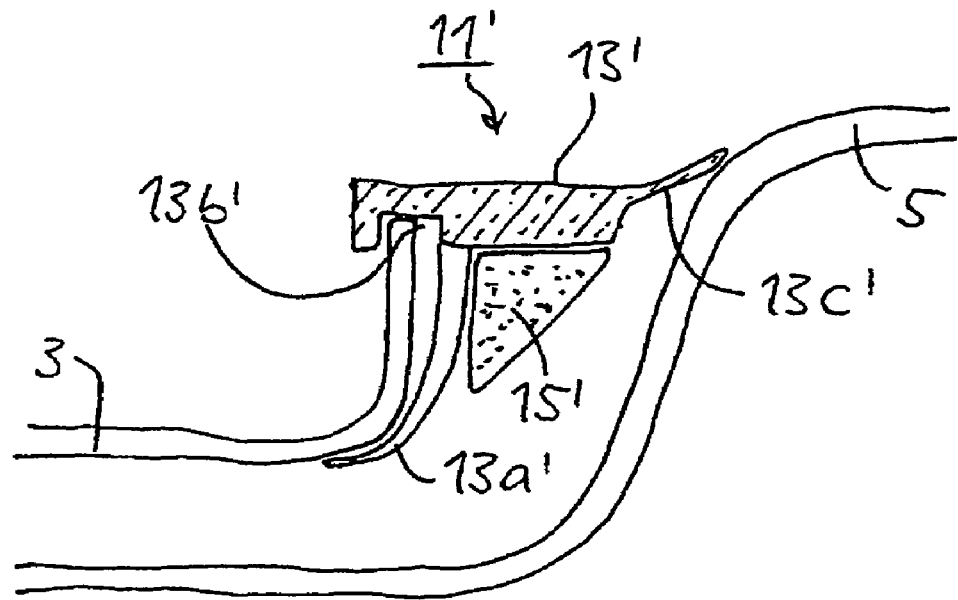
Figure 4:
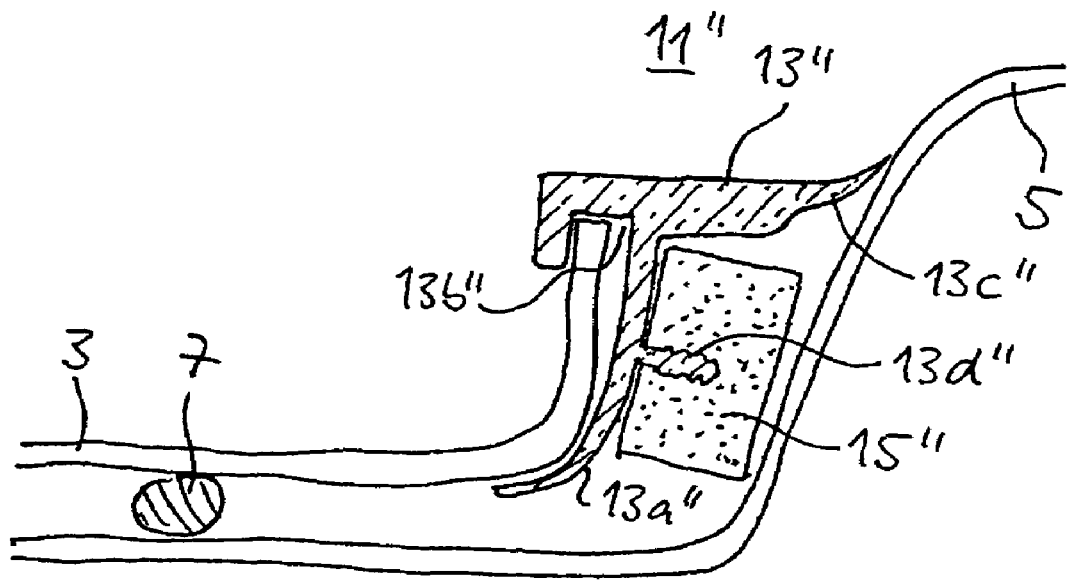
Figure 5A:
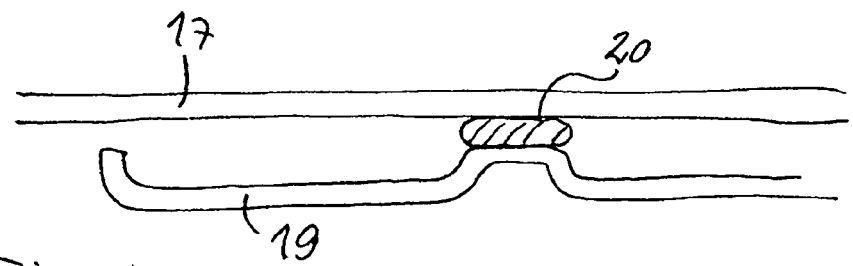
Figure 5B:
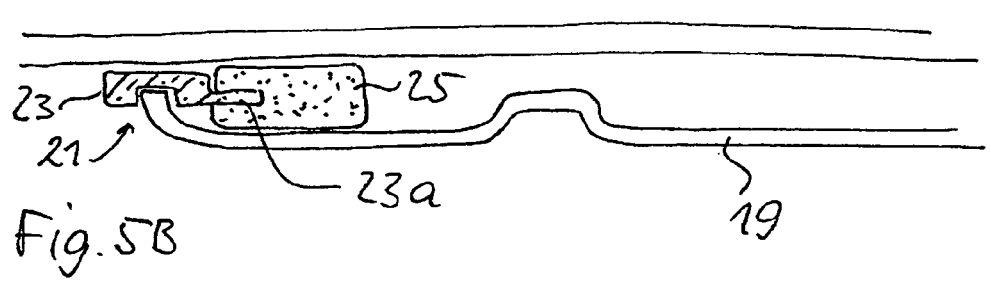
Figure 6:
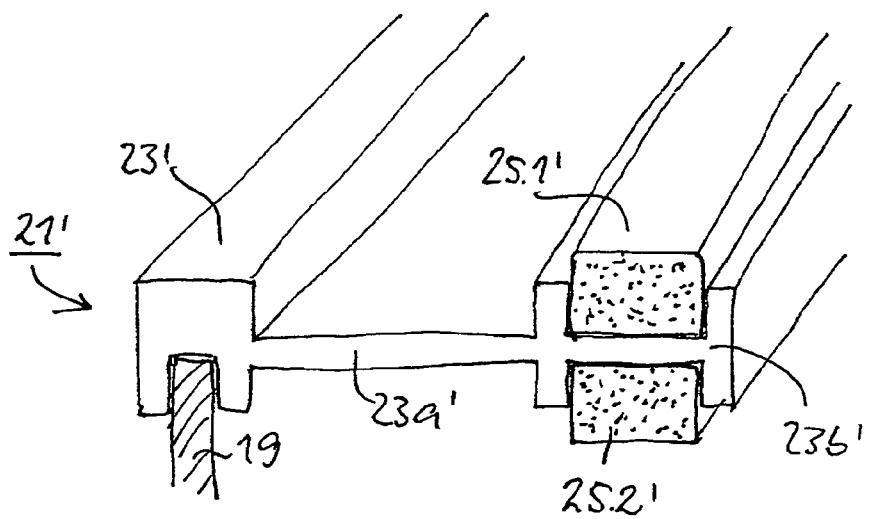
Figure 7:
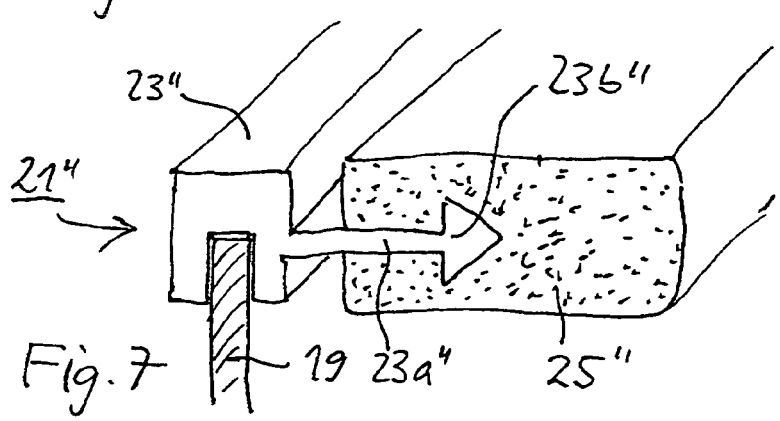
Figure 8A:
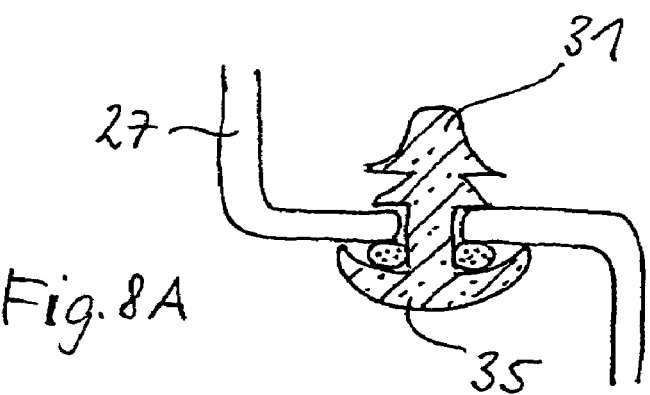
Figure 8B:
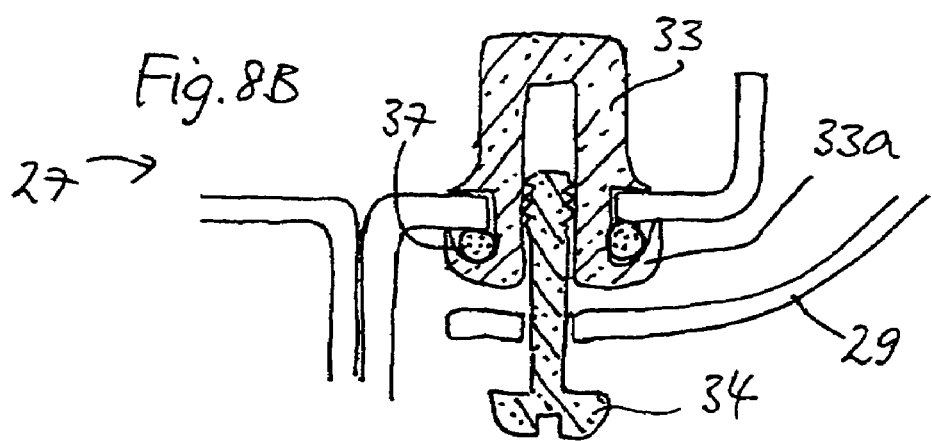
Figure 8C:
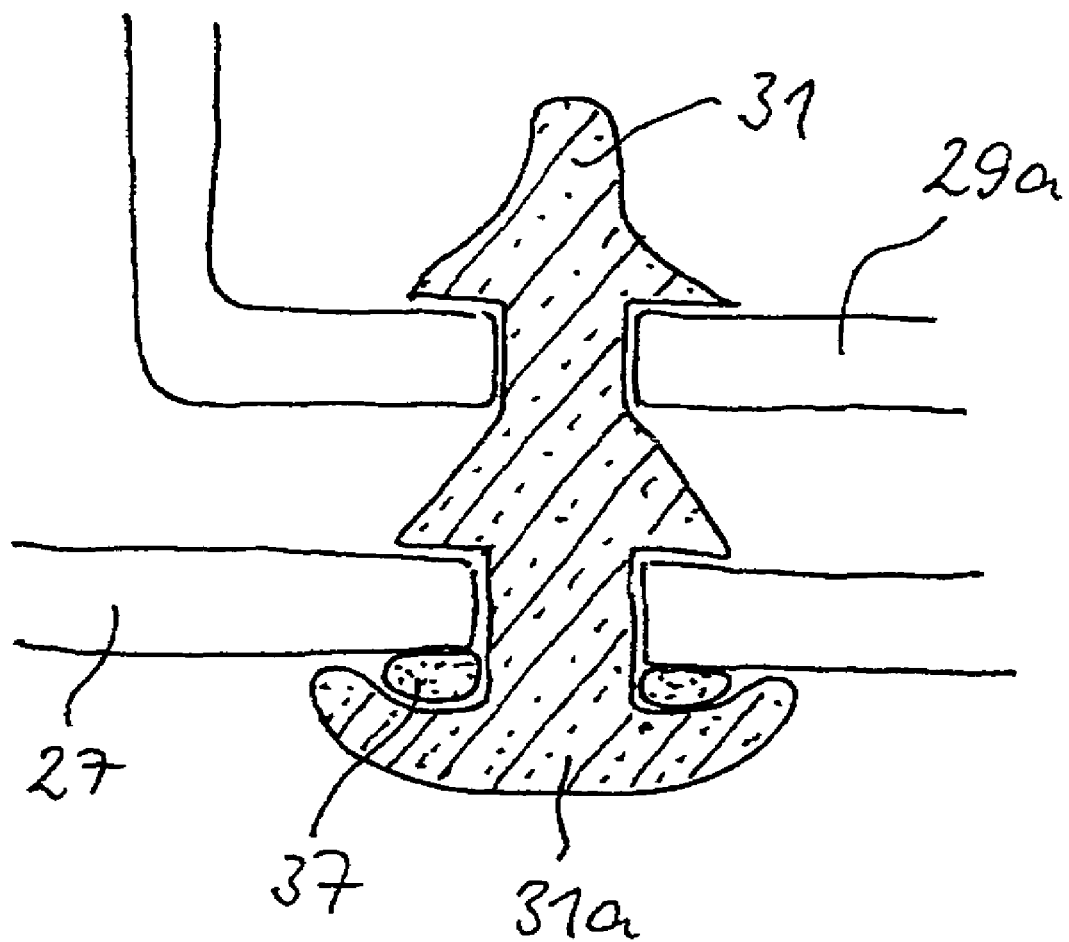

FIG. 1 is a sketch-like perspective representation of a MacPherson strut dome with inserted corrosion-protection element in a first embodiment, FIGS. 2A and 2B show a partial cross section of the arrangement according to FIG. 1 (FIG. 2A) and a cross-sectional drawing of the corrosion-protection element in the initial state (FIG. 2B), FIGS. 3 and 4 are partial cross-sectional drawings of the region shown in FIG. 2A, with modified corrosion-protection elements, FIGS. 5A and 5B show a schematic longitudinal section of a vehicle roof and a roof bow, with roof-lining means according to the state of the art (FIG. 5a) and according to an embodiment of the invention (FIG. 5B), FIGS. 6 and 7 are sketch-like perspective drawings of additional structural elements for a lining below the roof in the installed situation according to FIG. 5B, and FIGS. 8 and 8A to 8C are schematic cross-sectional drawings of a vehicle door structure (FIG. 8) and of regions thereof, in which pegs are used to anchor an external metal sheet to a door-carrier module; FIGS. 8A and 8C represent one and the same connection situation at various stages of the assembly process.

DETAILED DESCRIPTION OF THE INVENTION

FIGS. 1 and 2A show a section 1 of an automobile body that forms a support for a MacPherson strut in the vehicle, as viewed from above in a perspective sketch (FIG. 1) and in cross section along a line A-A. The strut support 1 comprises an external, hood-like first sheet-metal part 3, also termed outer dome, and an inner, second sheet-metal part 5, also termed inner dome. The outer and inner domes 3 and 5 are connected to one another by spot welds 7 arranged in a ring. Between the two domes is an annular gap 9, which in accordance with the invention is closed in a moisture-tight manner by a likewise annular corrosion-protection element 11 when the element is in its final state.

The corrosion-protection element 11 is constructed as a compound with a PA66 carrier layer 13 and, firmly attached thereto, an EVA layer 15. It is shown in FIG. 2A in its final state, after leaving a CDP bath, and shown in FIG. 2B in its initial state. At equal angular intervals it comprises several curved processes ("small feet") 13a, by way of which it resiliently overlaps an upwardly extending fold 17 of the outer dome 3 and holds itself there while in the non-expanded, initial state.

Otherwise, while in the non-expanded state, the corrosion-protection element 11 lies within the annular gap 9 with some lateral play, so that when the vehicle body is put into the CDP bath the anti-corrosion fluid can flow past the edges of the corrosion-protection element into the annular gap so as to cover and protect the metal surfaces of the outer dome 3 and inner dome 5 here as well, in particular also in the vicinity of the welded spots 7. Within the dip bath, which typically is at a temperature of over 150° C., the EVA layer expands both laterally and into the depths of the annular gap, as far as the metal boundary surfaces formed by the outer dome 3 and inner dome 5. As a result, the element is no longer fixed in place merely by the processes 13a but is also, over a large area, held there by the elastic pressing force exerted by the foamed EVA layer 15, so that it seals off the annular gap in a moisture-proof manner.

FIGS. 3 and 4 show the installed situation, as seen in FIG. 2A, with modified corrosion-protection elements 11' and 11". The corrosion-protection element 11' shown in FIG. 3 has a carrier 13' which in plan view likewise has the form of a circular ring, with clamping feet 13a' disposed internally and on the lower surface to fix it in position prior to the spot welding and immersion in the CDP bath. Here, again, an expandable EVA section 15' is moulded onto the underside, but in this case it has a triangular cross-sectional shape. An annular groove 13b' on the underside of the carrier 13' facilitates fitting onto the upward-extending section of the outer dome 3, and a sealing lip 13c' provided at the inner edge, and bent slightly upwards, serves to cover the annular gap between inner and outer domes 3, 5 so as to give a visually perfect appearance even if certain manufacturing tolerances are present. Because of its flexibility, the lip 13c' provides a certain extra space for expansion of the EVA section 15' as the latter foams in the CDP bath, but simultaneously prevents the external appearance from being impaired by overflowing foam.

In the further modified corrosion-protection element 11" shown in FIG. 4, nearly the same carrier is used as for the structural element 11' according to FIG. 3. Therefore the identical features will not be described again here. The only difference resides in the fact that vertically extending projections 13d" are moulded onto the clamping feet 13a" and serve to attach to the carrier 13" a foamable section 15" that is rectangular in cross section. FIGS. 5A to 7 show, again as a schematic, sketch-like drawing, another case of application of the proposed method and structural element, involving a section of an automobile roof 17 with underlying roof bow 19 (seen in longitudinal section) as well as the structural elements employed here (in cross-sectional or perspective representation). FIG. 5A shows how according to the state of the art a bead of adhesive 20 is provided between the roof 17 and the roof bow 19, to provide a lining between the two roof structures and at the same time ensure the necessary mechanical stability. Because this dual function can lead to mechanical tensions and deformations that might mark the outer surface of the roof, this solution is satisfactory only under certain conditions. FIG. 5B shows how in one embodiment of the invention there is disposed between roof and roof bow a lining element 21 that comprises a thermally stable carrier 23 and a thermally foamable section 25.

The t-stable carrier 23 can in particular consist of a polyamide, where appropriate with fibre reinforcement and/or a proportion of recycled materials, and its shape is adapted to the configuration of the edge region of the roof bow 19 in such a way that it can be snapped or clipped onto the latter, and by virtue of its elasticity in both material and shape is reliably fixed there for the duration of the procedure. To a section 23a that projects from the side of the carrier profile is attached the EVA section 25, which is approximately rectangular in cross section and in FIG. 5B is shown in the non-expanded state. In the expanded state it fills up the space between the roof 17 and the roof bow 19 in a flexible but moisture-proof manner, and hence both provides additional protection against corrosion for this cavity and also serves as an under-roof lining with advantageous mechanical properties.

In FIGS. 6 and 7 are sketched lining elements 21' and 21", which are modified with respect to the embodiment shown in FIG. 5B. The shape of the associated carrier, 23' and 23" respectively, basically resembles that of the carrier 23 in the embodiment according to FIG. 5B, except that the lateral projection 23a' or 23a" is provided with additional profiling for special purposes: to accommodate two EVA strands 25.1' and 25.2' in the case of 23b', or to assist retention of a flat EVA block 25" in the case of 23b". Another application of the invention is sketched in FIG. 8 to 8C. The sketch in FIG. 8 shows a cross section of an automobile door construction with a door-carrier module 27, an outer metal sheet 29 and a shaft reinforcement 29a. In this arrangement plastic pegs 31, 33—the latter in combination with a threaded bolt 34 (FIG. 8B)—are used to connect the door-carrier module 27 to the outer sheet 29 near the upper and lower edges, respectively.

Below each of the heads 31a and 33a of the pegs 31 and 33, respectively, is disposed a sealing ring 35 or 37, respectively, made of a thermally expandable material. The sealing rings are shown in the unexpanded, initial state in FIG. 8A to 8C; after they have expanded in the course of a heat-treatment step, they produce a moisture-proof seal of the annular gap between the associated pegs 31, 33 and the arrangement provided for them (not shown separately) in the relevant body metal. In addition, they ensure that the associated peg is kept tightly in place, and thus contribute towards preventing the occurrence of undesired noises.

The implementation of the invention is not restricted to this example but is also possible in a large number of further modifications which are within the scope of a person skilled in the art.

The invention claimed is:

1. A method for providing corrosion protection in assembly of two or more metal parts, at least one of which is made of sheet metal, and which are joined in a fashion leaving a space between the parts, the method comprising the steps of:

(a) forming a carrier having a groove therein for engaging an edge region of the at least one sheet metal part;

(b) attaching to the carrier a thermally-foamable element, such that the thermally-foamable element, with the carrier engaging the edge region of the at least one sheet metal part, and the parts joined, is disposed in the space between the parts; and (c) exposing the assembly of the two metal parts in further processing to heat sufficient to foam the thermally-foamable element to fill the space between the parts.

2. The method of claim 1 wherein both parts are made of sheet metal, and one has a linear edge which the groove of the carrier engages.

3. The method of claim 2 wherein the parts are an automobile roof and a roof bow.

4. A method for providing corrosion protection in assembly of a hood like sheet metal part having a circular opening with a turned-up edge, and an inner dome projecting through the opening for providing a strut support, the two parts spot-welded in a manner leaving an annular gap between the parts, the method comprising the steps of:

(a) forming a carrier in a ring shape of a size to fit over the dome and cover the annular gap, and having extending processes outwardly from the ring to engage the turned-up edge of the sheet metal part;

(b) attaching to the carrier ring a thermally-foamable element, such that the thermally-foamable element, with the carrier ring engaging the turned-up edge, is disposed in the annular gap; and (c) exposing the assembly of the two metal parts in further processing to a heat sufficient to foam the thermally-foamable element to fill the space between the parts.

5. The method of claim 4 wherein, in step (a) the carrier ring is formed with an outer diameter sufficient that the carrier ring overlaps the turned-up edge, and with a groove to engage the turned up edge.

6. The method of claim 4 wherein the inner dome is adapted for a Macpherson strut.

7. A method for anchoring a plastic peg having a shaft of one diameter and a head of a larger diameter, the peg used to join first and second metal parts through aligned holes in automotive assembly, comprising steps of:

(a) placing a ring of thermally-foamable material over the shaft against the head;

(b) inserting the plastic peg with the thermally foamable ring through the aligned holes such that the thermally foamable ring bears against the first metal part; and (c) exposing the assembly of the peg and the two metal parts in further processing to heat sufficient to foam the thermally-foamable element to seal between the peg and the first metal part.

8. The method of claim 7 wherein the head is shaped to provided a gap between the head and the first metal part with the peg fully inserted, such that the thermally-foamable material when foamed, fills the gap.

\* \* \* \* \*